United States Patent
Ishikawa et al.

(10) Patent No.: US 11,173,958 B2
(45) Date of Patent: Nov. 16, 2021

(54) CRASH BOX

(71) Applicants: TOYOTA JIDOSHA KABUSHIKI KAISHA, Toyota (JP); NIKKEIKIN ALUMINIUM CORE TECHNOLOGY COMPANY LTD., Tokyo (JP)

(72) Inventors: Daisuke Ishikawa, Toyota (JP); Taichi Terada, Shizuoka (JP)

(73) Assignees: Toyota Jidosha Kabushiki Kaisha, Toyota (JP); Nikkeikin Aluminium Core Technology Company Ltd., Tokyo (JP)

( * ) Notice: Subject to any disclaimer, the term of this patent is extended or adjusted under 35 U.S.C. 154(b) by 66 days.

(21) Appl. No.: 16/727,056

(22) Filed: Dec. 26, 2019

(65) Prior Publication Data
US 2020/0223486 A1    Jul. 16, 2020

(30) Foreign Application Priority Data

Jan. 11, 2019  (JP) .............................. JP2019-003391

(51) Int. Cl.
*B62D 21/15*   (2006.01)
*B60R 19/34*   (2006.01)

(52) U.S. Cl.
CPC .............. *B62D 21/15* (2013.01); *B60R 19/34* (2013.01)

(58) Field of Classification Search
CPC ......... B62D 21/15; B60R 19/24; B60R 19/26; B60R 19/34; B60R 2019/262; F16F 7/003; F16F 7/12; F16F 7/123

USPC .................................................. 293/132, 133
See application file for complete search history.

(56) References Cited

U.S. PATENT DOCUMENTS

| | | | | |
|---|---|---|---|---|
| 5,803,514 A | * | 9/1998 | Shibuya | B60R 19/18 293/132 |
| 6,334,638 B1 | * | 1/2002 | Yamamuro | B60R 19/34 293/132 |
| 6,371,541 B1 | * | 4/2002 | Pedersen | B60R 19/34 293/132 |
| 6,808,215 B2 | * | 10/2004 | Sakuma | B60R 19/34 293/102 |
| 6,871,890 B2 | * | 3/2005 | Sato | B60R 19/24 293/122 |
| 6,896,317 B2 | * | 5/2005 | Liebhard | B60R 19/34 293/102 |

(Continued)

FOREIGN PATENT DOCUMENTS

| | | |
|---|---|---|
| JP | 2004-148955 | 5/2004 |
| JP | 2011-143793 | 7/2011 |
| JP | 2018-103783 | 7/2018 |

*Primary Examiner* — Gregory A Blankenship
(74) *Attorney, Agent, or Firm* — Finnegan, Henderson, Farabow, Garrett & Dunner, LLP

(57) ABSTRACT

A crash box is configured to absorb an impact caused by a collision of a vehicle. The crash box includes a front end surface configured to receive the impact, a rear end surface configured to be attached to the vehicle; and a first wall surface and a second wall surface both extending from the rear end surface to the front end surface. The first wall surface and the second wall surface face each other. A length of the second wall surface from the front end surface to the rear end surface is longer than a length of the first wall surface from the front end surface to the rear end surface.

2 Claims, 8 Drawing Sheets

(56) References Cited

U.S. PATENT DOCUMENTS

| | | | | |
|---|---|---|---|---|
| 7,077,442 B2* | 7/2006 | Arns | .................... | B60R 19/34 |
| | | | | 293/132 |
| 7,357,432 B2* | 4/2008 | Roll | .................... | B60R 19/18 |
| | | | | 293/120 |
| 8,002,338 B2* | 8/2011 | Yasuhara | ............. | B62D 21/152 |
| | | | | 296/203.02 |
| 8,276,954 B2* | 10/2012 | Handing | ................ | B60R 19/03 |
| | | | | 293/133 |
| 8,297,668 B2* | 10/2012 | Nakanishi | ............... | B60R 19/34 |
| | | | | 293/132 |
| 8,454,064 B2* | 6/2013 | Frank | .................... | B60R 19/34 |
| | | | | 293/155 |
| 8,632,108 B2* | 1/2014 | Matuschek | ............ | B60R 19/34 |
| | | | | 293/133 |
| 2014/0353990 A1* | 12/2014 | Ishitobi | ............... | B21D 39/044 |
| | | | | 293/133 |
| 2018/0037179 A1* | 2/2018 | Steinebach | ........... | B23K 31/02 |
| 2018/0178641 A1 | 6/2018 | Yamafuji et al. | | |
| 2018/0370468 A1* | 12/2018 | Yokota | ................. | B62D 21/15 |
| 2019/0256023 A1* | 8/2019 | Tashiro | ................ | B60R 19/34 |
| 2019/0351854 A1* | 11/2019 | Bae | ........................ | B60R 19/18 |
| 2020/0223486 A1* | 7/2020 | Ishikawa | ............... | B62D 21/15 |
| 2021/0046889 A1* | 2/2021 | Yokota | ................... | B60R 19/18 |

* cited by examiner

CRASH BOX

INCORPORATION BY REFERENCE

The disclosure of Japanese Patent Application No. 2019-003391 filed on Jan. 11, 2019 including the specification, drawings and abstract is incorporated herein by reference in its entirety.

BACKGROUND

1. Technical Field

The disclosure generally relates to a crash box, and more specifically relates to a crash box configured to be mounted in a vehicle.

2. Description of Related Art

Japanese Unexamined Patent Application Publication No. 2018-103783 (JP 2018-103783 A) describes a crash box configured to be mounted in a vehicle.

SUMMARY

The size of the crash box described above is limited to a predetermined size such that the crash box can be disposed in a space in the vehicle. The crash box is required to have a high shock-absorbing capability and required also to be compact and space-saving.

The disclosure provides a compact and space-saving crash box having a high shock-absorbing capability.

A crash box according to an aspect of the disclosure is configured to absorb an impact caused by a collision of a vehicle. The crash box includes a front end surface configured to receive the impact, a rear end surface configured to be attached to the vehicle, and a first wall surface and a second wall surface both extending from the rear end surface to the front end surface. The first wall surface and the second wall surface face each other, A length of the second wall surface from the front end surface to the rear end surface is longer than a length of the first wall surface from the front end surface to the rear end surface.

With the above configuration, it is possible to adjust the crush timings of the first wall surface and the second wall surface, which face each other, such that the crush timing of the first wall surface and the crush timing of the second wall surface differ from each other. That is, the position at which the peak of a load due to crushing of the first wall surface occurs differs from the position at which the peak of a load due to crushing of the second wall surface occurs. Thus, the shock absorption capacity can be increased. Consequently, the crash box has a high shock-absorbing capability while being compact and space-saving.

In the above aspect, an absolute value of a difference between the length of the first wall surface and the length of the second wall surface may be equal to approximately 50% of a buckling wavelength of the first wall surface or approximately 50% of a buckling wavelength of the second wall surface.

With this configuration, the difference in the timings of the crushings of the first wall surface and the second wall surface facing each other is large. Thus, the shock absorption capacity can be further increased. Consequently, the crash box has a higher shock-absorbing capability while being compact and space-saving.

In the above aspect, at least one of the first wall surface and the second wall surface may be provided with a cutout.

With this configuration, it is possible to further increase the shock absorption capacity and to reduce the amount of impact to be transmitted to a member at the time of reception of an initial load.

With the foregoing aspect of the disclosure, it is possible to provide a compact and space-saving crash box having a high shock-absorbing capability.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, example embodiments of the disclosure will be described in detail with reference to the accompanying drawings. Note that the disclosure is not limited to the following embodiments. For the sake of clarity, the following description and the drawings are simplified as appropriate.

First Embodiment

Figure 1:
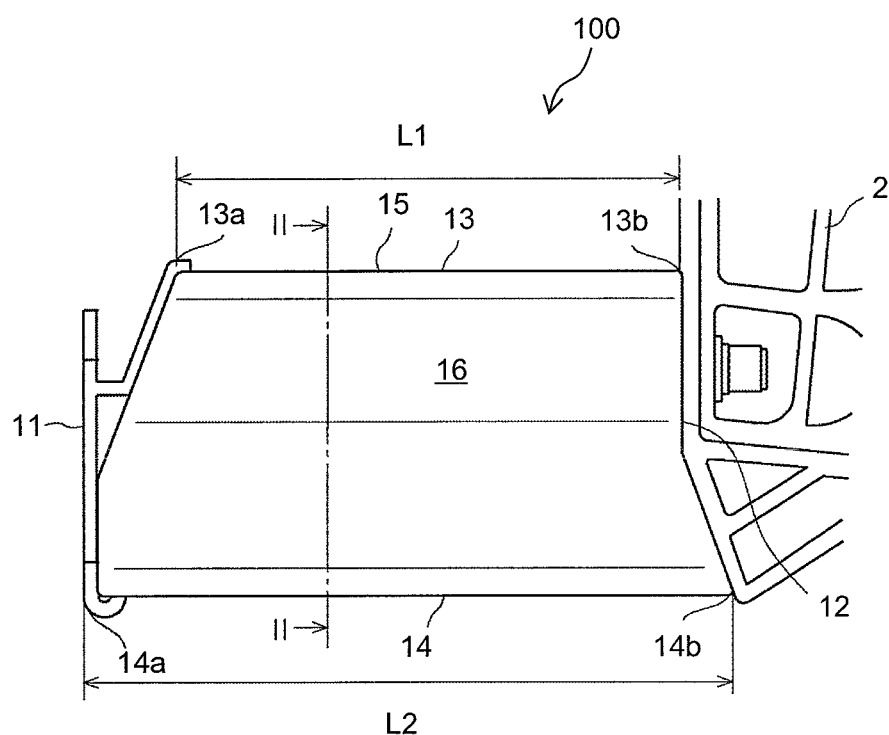
FIG. 1 is a left side view of a crash box according to a first embodiment.
Figure 2:
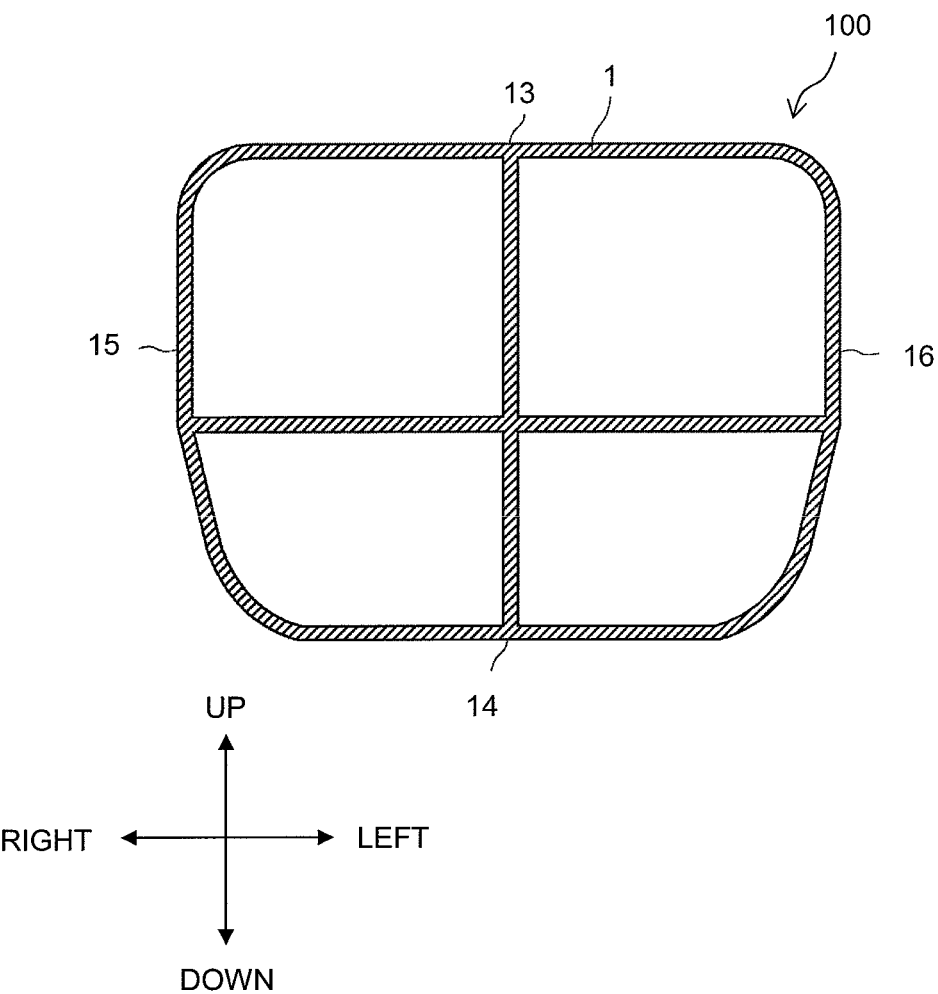
FIG. 2 is a cross-sectional view of the crash box according to the first embodiment.
Figure 3:
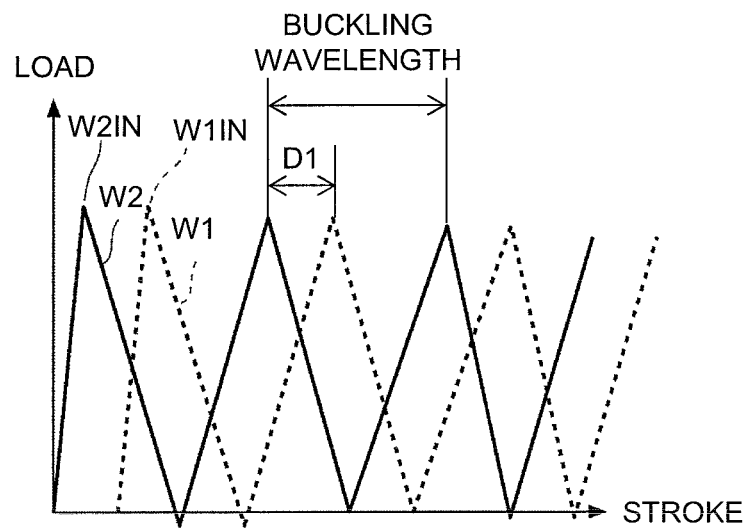
FIG. 3 is a graph schematically illustrating an example of a load with respect to a stroke.
Figure 4:
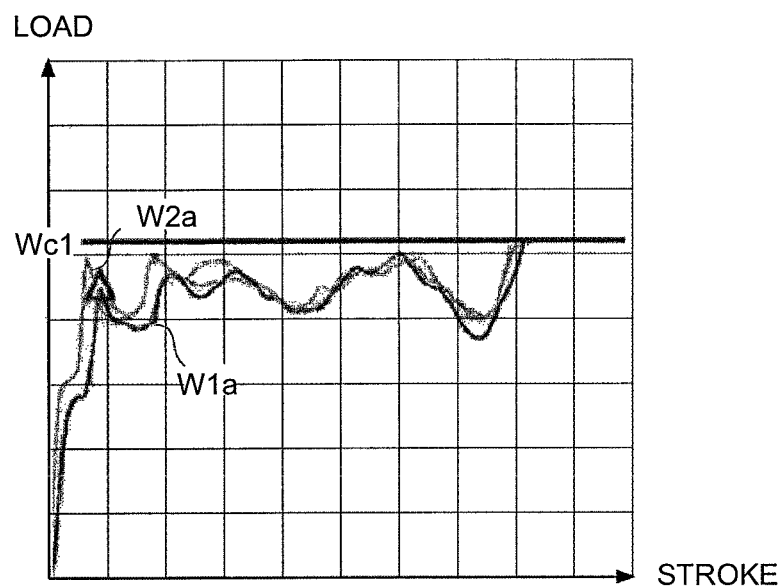
FIG. 4 is a graph illustrating another example of a load with respect to a stroke.

A first embodiment will be described with reference to FIG. 1 to FIG. 3. FIG. 1 is a left side view of a crash box 100 according to the first embodiment. FIG. 2 is a cross-sectional view of the crash box 100 according to the first embodiment. FIG. 2 illustrates a cross-section of the crash box 100 illustrated in FIG. 1. FIG. 3 is a graph schematically illustrating an example of a load with respect to a stroke. FIG. 4 is a graph illustrating another example of a load with respect to a stroke. As a matter of course, three-dimensional orthogonal coordinates illustrated in FIG. 1 and other drawings are provided for convenience in describing the positional relationships among the elements.

As illustrated in FIG. 1, the crash box 100 is a box-shaped body having a predetermined length in the front-rear direction. The crash box 100 is attached to a cross member 2 disposed in a front portion of a vehicle (not illustrated). The cross member 2 may be attached to, for example, a part of an engine compartment. The part of the engine compartment, to which the cross member 2 may be attached, is, for example, a stack frame that holds a cell stack. The cell stack is, for example, a fuel cell stack or a secondary cell stack (a secondary battery). In the event of a collision of the vehicle, the crash box 100 receives an impact, thereby being crushed in the front-rear direction. Consequently, the crash box 100 can absorb the impact caused by the collision of the vehicle.

As illustrated in FIG. 1 and FIG. 2, the crash box 100 includes a front end surface 11, a rear end surface 12, a top surface 13 (an example of "first wall surface"), a bottom surface 14 (an example of "second wall surface"), a right side surface 15, and a left side surface 16. The crash box 100 is a tubular body extending from the front end surface 11 to the rear end surface 12. An example of the crash box 100 illustrated in FIG. 2 includes a vertical rib extending in the front-rear direction and in the up-down direction, and a lateral rib extending in the front-rear direction and in the lateral direction (in the right-left direction).

The front end surface 11 is a surface that directly receives an impact in the event of a collision of the vehicle. The rear end surface 12 faces the front end surface 11, and the rear end surface 12 is attached to the cross member 2. The rear end surface 12 is a bent surface. Specifically, the rear end surface 12 includes a parallel surface that is substantially parallel to a vertical line, and a slanted surface that is contiguous with the parallel surface and that is slanted with respect to the vertical line.

The top surface 13 is a flat surface extending from the rear end surface 12 to the front end surface 11. The top surface 13 includes a front end 13a located on the front end surface 11-side and a rear end 13b located on the rear end surface 12-side. A length L1 of the top surface 13 from the front end 13a to the rear end 13b (an example of "a length of the first wall surface") is a predetermined length.

The bottom surface 14 faces the top surface 13. Like the top surface 13, the bottom surface 14 is a flat surface extending from the rear end surface 12 to the front end surface 11. The bottom surface 14 includes a front end 14a located on the front end surface 11-side and a rear end 14b located on the rear end surface 12-side. A length L2 of the bottom surface 14 from the front end 14a to the rear end 14b (an example of "a length of the second wall surface") is a predetermined length. The length L2 is longer than the length L1. In other words, the length L2 of the bottom surface 14 from the front end surface 11 to the rear end surface 12 is longer than the length L1 of the top surface 13 from the front end surface 11 to the rear end surface 12.

The right side surface 15 is a flat surface extending from the rear end surface 12 to the front end surface 11. The right side surface 15 connects a right end portion of the top surface 13 to a right end portion of the bottom surface 14. The left side surface 16 faces the right side surface 15. Like the right side surface 15, the left side surface 16 is a flat surface extending from the rear end surface 12 to the front end surface 11. The left side surface 16 connects a left end portion of the top surface 13 to a left end portion of the bottom surface 14.

In the event of a collision of the vehicle provided with the crash box 100, the crash box 100 receives an impact in the front-rear direction, thereby being crushed. When the crash box 100 is being crushed, the front end surface 11 moves toward the rear end surface 12. A moving distance of the front end surface 11 will be referred to as "stroke". An example of how a load received by the top surface 13 changes with respect to the stroke and an example of how a load received by the bottom surface 14 changes with respect to the stroke are measured. As results of the measurements, a load-displacement curve W1 of the top surface 13 and a load-displacement curve W2 of the bottom surface 14 are schematically illustrated in FIG. 3.

As illustrated in FIG. 3, the load-displacement curve W1 of the top surface 13 and the load-displacement curve W2 of the bottom surface 14 each exhibit a buckling wavelength at which the load changes with a predetermined cycle with respect to the stroke. The buckling wavelength is determined based on, for example, a material and thickness of each of the top surface 13 and the bottom surface 14. The buckling wavelength of the load-displacement curve W1 of the top surface 13 and the buckling wavelength of the load-displacement curve W2 of the bottom surface 14 are substantially equal to each other. The load-displacement curves W1, W2 exhibit initial load peaks W1IN, W2IN, respectively. The peak of the load-displacement curve W1 and the peak of the load-displacement curve W2 are shifted from each other by a predetermined stroke amount D1. The absolute value of a difference ΔL between the length L1 and the length L2 is approximately 50% of the buckling wavelength of the load-displacement curve W1 of the top surface 13 or approximately 50% of the buckling wavelength of the load-displacement curve W2 of the bottom surface 14. For example, the absolute value of the difference ΔL is within a range from 46% of the buckling wavelength to 56% of the buckling wavelength. In other words, when the buckling wavelength is 15 mm, the absolute value of the difference ΔL is about 7 mm to about 8 mm.

In other words, it is possible to adjust the crush timings of the top surface 13 and the bottom surface 14, which face each other, such that the crush timing of the top surface 13 and the crush timing of the bottom surface 14 differ from each other. Thus, the shock absorption capacity can be increased. Consequently, the crash box 100 has a high shock-absorbing capability while being compact and space-saving.

Load-displacement curves W1a, W2a of an example of the crash box 100 are measured under predetermined conditions, and the measured load-displacement curves W1a, W2a are illustrated in FIG. 4. The load-displacement curves W1a, W2a are specific examples of the load-displacement curves W1, W2, respectively. As illustrated in FIG. 4, the load-displacement curves W1a, W2a fall within a range up to a load criterion Wc1 (the load-displacement curves W1a, W2a does not exceed the load criterion Wc1) regardless of the stroke amount.

MODIFIED EXAMPLES

Next, crash boxes 100a to 100e in first to fifth modified examples of the first embodiment will be described.

First Modified Example

Figure 5:
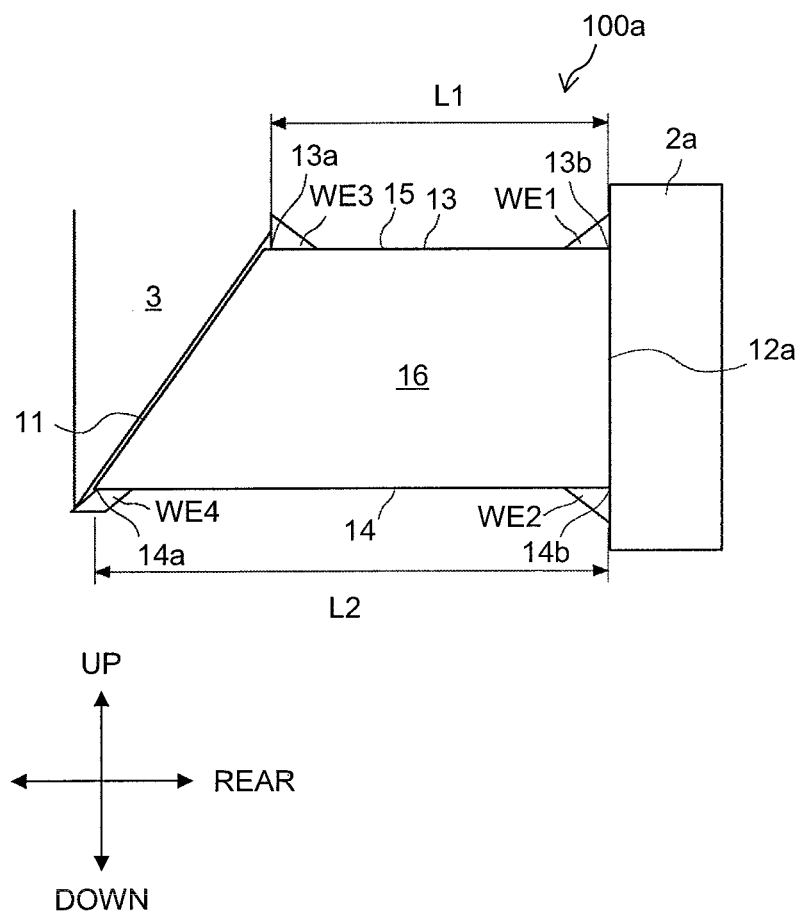
FIG. 5 is a left side view of a crash box in a first modified example of the first embodiment.

FIG. 5 illustrates the crash box 100a in the first modified example. FIG. 5 is a left side view of the crash box 100a in the first modified example of the first embodiment. The crash box 100a is a modified example of the crash box 100 illustrated in FIG. 1. The crash box 100a has the same configuration as that of the crash box 100 except for the configuration of the rear end surface.

The crash box 100a includes a rear end surface 12a. The rear end surface 12a faces the front end surface 11, and the rear end surface 12a is attached to a cross member 2a of the vehicle. The rear end surface 12a is a flat surface extending in the up-down direction. The cross member 2a includes a flat surface extending in the up-down direction, and the cross member 2a has a shape that conforms to the rear end surface 12a. As illustrated in FIG. 5, a peripheral device 3 is disposed so as to face the front end surface 11. Furthermore, elements of the crash box 100a are joined to other components by welding portions WE1, WE2, WE3, WE4.

Second Modified Example

Figure 6:
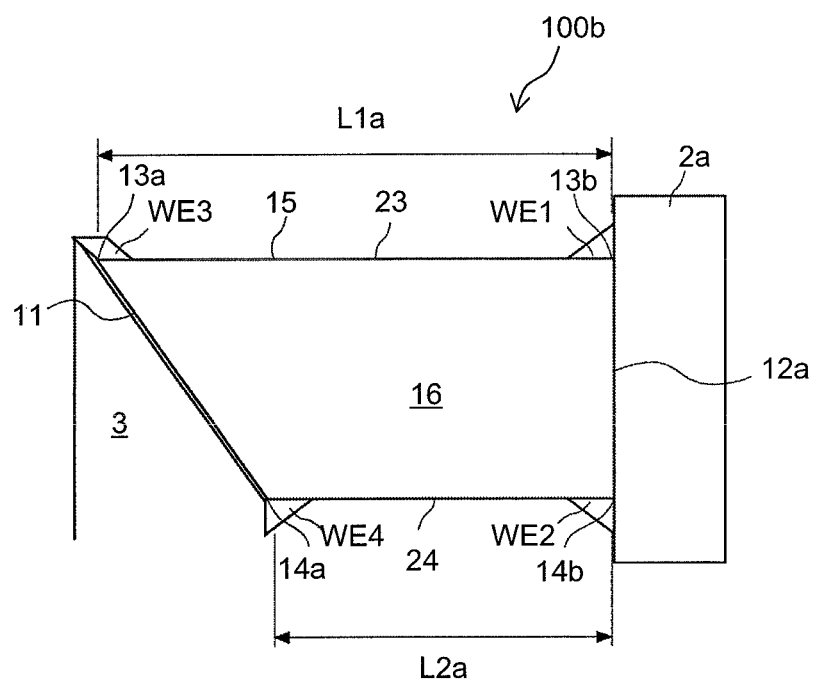
FIG. 6 is a left side view of a crash box in a second modified example of the first embodiment.
Figure 6:
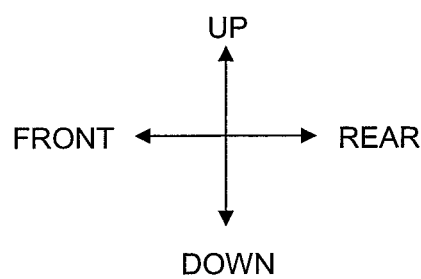

FIG. 6 illustrates the crash box 100b in the second modified example. FIG. 6 is a left side view of the crash box 100b in the second modified example of the first embodiment. The crash box 100b is a modified example of the crash box 100 illustrated in FIG. 1, or a modified example of the crash box 100a illustrated in FIG. 5. The crash box 100b has the same configuration as that of the crash box 100a illustrated in FIG. 5 except for the length of the top surface and length of the bottom surface.

The crash box 100b includes a top surface 23 and a bottom surface 24.

The top surface 23 has the same configuration as that of the top surface 13, except for the length from the front end 13a to the rear end 13b. A length L1a of the top surface 23 from the front end 13a to the rear end 13b is equal to the length L2 of the bottom surface 14 illustrated in FIG. 5.

The bottom surface 24 has the same configuration as that of the bottom surface 14, except for the length from the front end 14a to the rear end 14b. A length L2a of the bottom surface 24 from the front end 14a to the rear end 14b is equal to the length L1 of the top surface 13 illustrated in FIG. 5. The length L1a is longer than the length L2a. In other words, the length L1a of the top surface 23 from the front end surface 11 to the rear end surface 12a is longer than the length L2a of the bottom surface 24 from the front end surface 11 to the rear end surface 12a.

Third Modified Example

Figure 7:
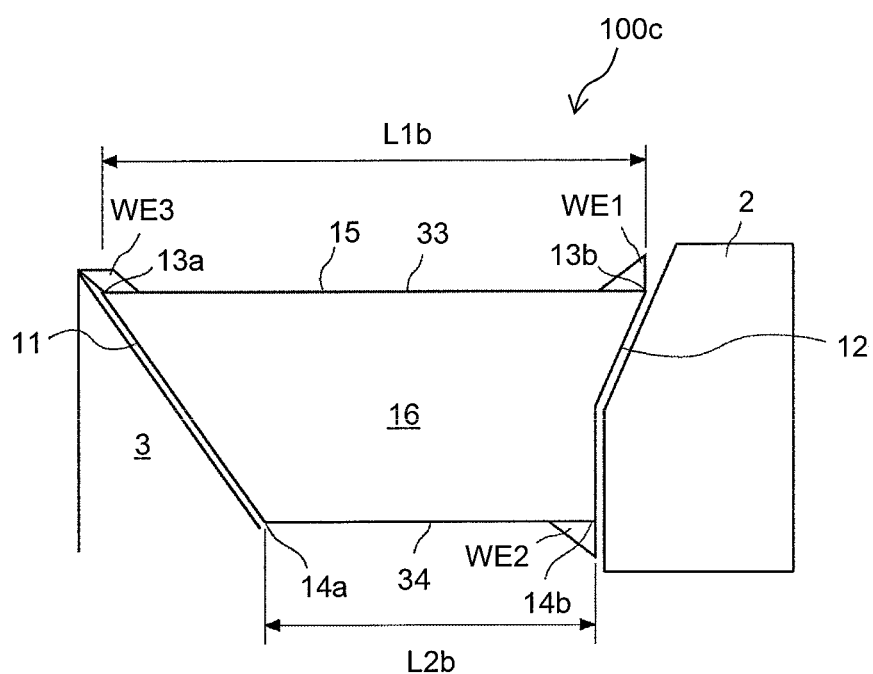
FIG. 7 is a left side view of a crash box in a third modified example of the first embodiment.
Figure 7:
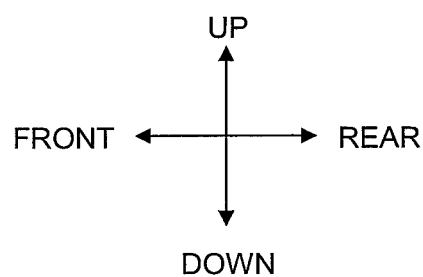

FIG. 7 illustrates the crash box 100c in the third modified example. FIG. 7 is a left side view of the crash box 100c in the third modified example of the first embodiment. The crash box 100c is a modified example of the crash box 100 illustrated in FIG. 1. The crash box 100c has the same configuration as that of the crash box 100 illustrated in FIG. 1, except for the lengths of the top surface and the bottom surface.

The crash box 100c includes a top surface 33 and a bottom surface 34.

The top surface 33 has the same configuration as that of the top surface 13, except for the length from the front end 13a to the rear end 13b. A length L1b of the top surface 33 from the front end 13a to the rear end 13b is equal to the length L2 of the bottom surface 14 illustrated in FIG. 1.

The bottom surface 34 has the same configuration as that of the bottom surface 14, except for the length from the front end 14a to the rear end 14b. A length L2b of the bottom surface 34 from the front end 14a to the rear end 14b is equal to the length L1 of the top surface 13 illustrated in FIG. 1. The length L1b is longer than the length L2b. In other words, the length L1b of the top surface 33 from the front end surface 11 to the rear end surface 12 is longer than the length L2b of the bottom surface 24 from the front end surface 11 to the rear end surface 12.

Fourth Modified Example

Figure 8:
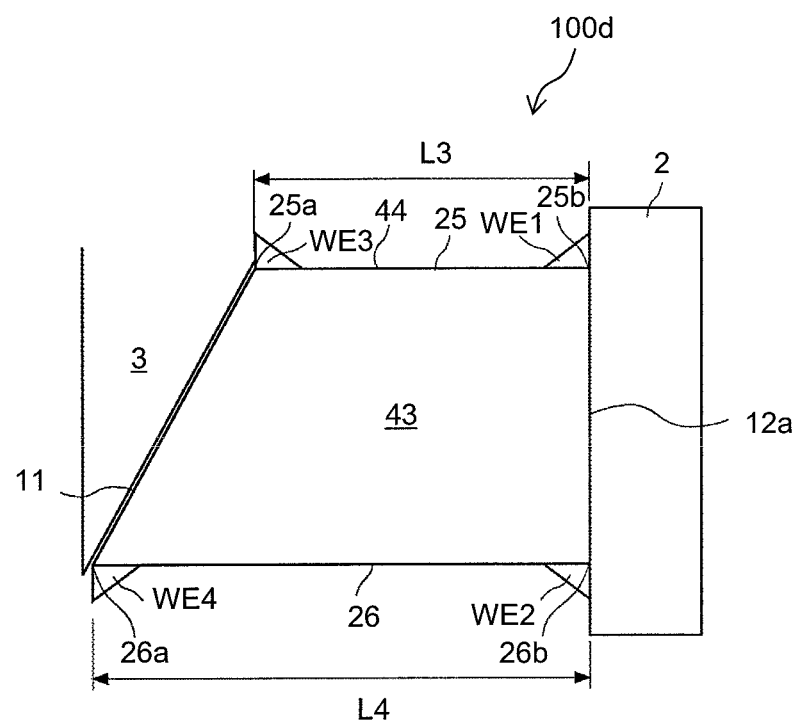
FIG. 8 is a top view of a crash box in a fourth modified example of the first embodiment.
Figure 8:
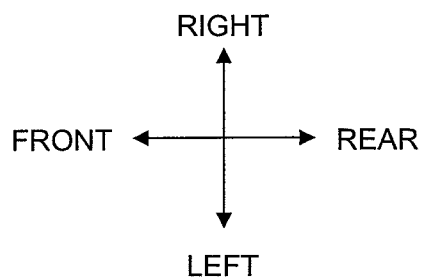

FIG. 8 illustrates the crash box 100d in the fourth modified example. FIG. 8 is a top view of the crash box 100d in the fourth modified example of the first embodiment. The crash box 100d is a modified example of the crash box 100 illustrated in FIG. 1, or a modified example of the crash box 100a illustrated in FIG. 5. The crash box 100d has the same configuration as that of the crash box 100a illustrated in FIG. 5, except for lengths of the top surface, the bottom surface, the right side surface, and the left side surface.

The crash box 100d includes a right side surface 25, a left side surface 26, a top surface 43, and a bottom surface 44.

The right side surface 25 has the same configuration as that of the top surface 13 as illustrated in FIG. 5 except that the right side surface 25 is a right side surface of the crash box 100d. The right side surface 25 includes a front end 25a located on the front end surface 11-side and a rear end 25b located on the rear end surface 12a-side. A length L3 of the right side surface 25 from the front end 25a to the rear end 25b is a predetermined length.

The left side surface 26 has the same configuration as that of the bottom surface 14 illustrated in FIG. 5 except that the left side surface 26 is a left side surface of the crash box 100d. The left side surface 26 includes a front end 26a located on the front end surface 11-side and a rear end 26b located on the rear end surface 12a-side. A length L4 of the left side surface 26 from the front end 26a to the rear end 26b is a predetermined length. The length L4 is longer than the length L3.

The top surface 43 has the same configuration as that of the left side surface 16 illustrated in FIG. 5 except that the top surface 43 is a top surface of the crash box 100d. The bottom surface 44 has the same configuration as that of the right side surface 15 illustrated in FIG. 5 except that the bottom surface 44 is a bottom surface of the crash box 100d.

With the configurations described above, in each of the crash box 100a, the crash box 100b, the crash box 100c, and the crash box 100d, as well as in the crash box 100, it is possible to adjust the crush timings of the wall surfaces, which face each other, such that the crush timings of these wall surfaces differ from each other. Thus, the shock absorption capacity can be increased. Consequently, each of the crash box 100a, the crash box 100b, the crash box 100c, and the crash box 100d has a high shock-absorbing capability while being compact and space-saving.

Fifth Modified Example

Figure 9:
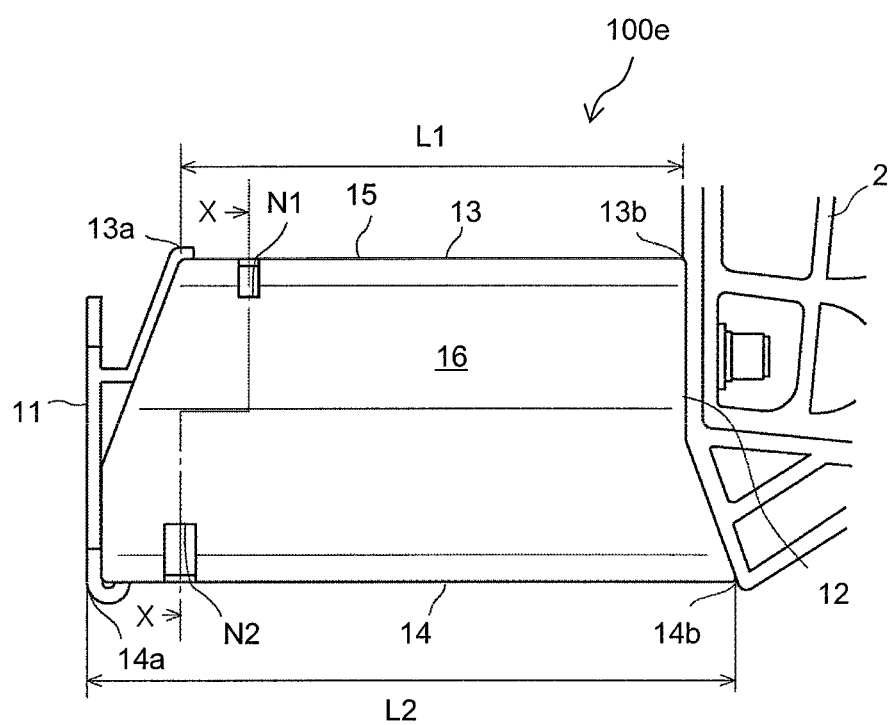
FIG. 9 is a left side view of a crash box in a fifth modified example of the first embodiment.
Figure 9:
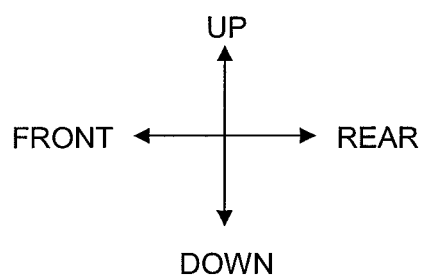
Figure 10:
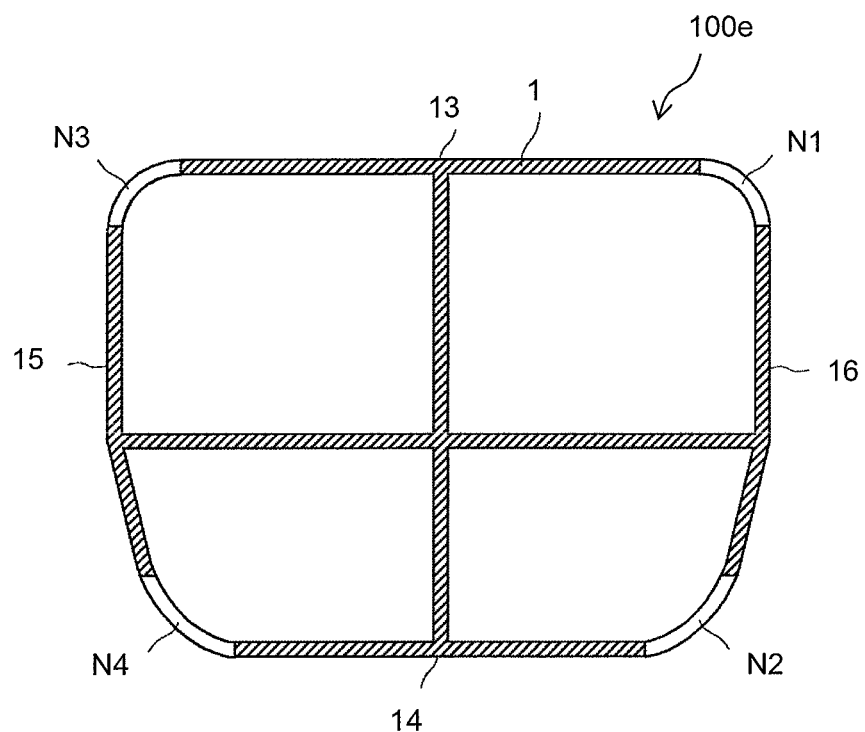
FIG. 10 is a cross-sectional view of the crash box in the fifth modified example of the first embodiment.
Figure 10:
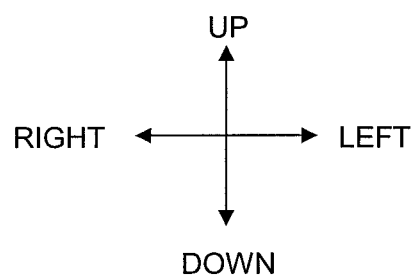

FIG. 9 and FIG. 10 illustrate the crash box 100e in the fifth modified example. FIG. 9 is a left side view of the crash box 100e in the fifth modified example of the first embodiment. FIG. 10 is a cross-sectional view of the crash box 100e in the fifth modified example of the first embodiment. The crash box 100e has the same configuration as that of the crash box 100 illustrated in FIG. 1, except that the crash box 100e is provided with cutouts N1, N2, N3, N4. The configurations of the crash box 100e that differ from those of the crash box 100 will be described below.

As illustrated in FIG. 9 and FIG. 10, the crash box 100e is provided with the cutouts N1, N2, N3, N4. A specific example of each of the cutouts N1, N2, N3, N4 illustrated in FIG. 9 and FIG. 10 is in a rectangular shape. However, each of the cutouts N1, N2, N3, N4 may be in various shapes, such as a generally triangular shape, a generally polygonal shape, a generally circular shape, and a generally semicircular shape. The cutout N1 is located at a junction between the top surface 13 and the left side surface 16, and the cutout N2 is located at a junction between the left side surface 16 and the bottom surface 14. The cutout N3 is located at a junction between the top surface 13 and the right side surface 15, and the cutout N4 is located at a junction between the right side surface 15 and the bottom surface 14.

Each of the cutouts N1, N3 is provided at a position that is apart from the front end 13a toward the rear end 13b by an amount corresponding to $1/7$ to $1/8$ of the length L1. Each of the cutouts N2, N4 is provided at a position that is apart from the front end 14a toward the rear end 14b by an amount corresponding to $1/7$ to $1/8$ of the length L2.

In the event of a collision of the vehicle provided with the crash box 100e, the crash box 100e receives an impact in the front-rear direction, thereby being crashed. When the crash box 100e is being crushed, the front end surface 11 moves toward the rear end surface 12. When the front end surface 11 reaches the cutouts N1, N3, N2, N4, an increase in the load is curbed. Each of the cutouts N1, N3 is provided at a position that is apart from the front end 13a toward the rear end 13b by an amount corresponding to $1/7$ to $1/8$ of the length L1. Each of the cutouts N2, N4 is located at a position that is apart from the front end 14a toward the rear end 14b by an amount corresponding to $1/7$ to $1/8$ of the length L2. Thus, the peak of the initial load due to crushing is reduced.

Like the crash box 100, the peak of the load-displacement curve W1 and the peak of the load-displacement curve W2 are shifted from each other by the predetermined stroke amount D1, as illustrated in FIG. 3. Thus, it is possible to adjust the crush timings of the top surface 13 and the bottom surface 14, which face each other, such that the crush timing of the top surface 13 and the crush timing of the bottom surface 14 differ from each other. Thus, the shock absorption capacity can be increased. Consequently, the crash box 100e has a high shock-absorbing capability while being compact and space-saving. In addition, the peak of the initial load due to crushing is reduced by the cutouts.

The disclosure is not limited to the embodiments stated above, and may be modified as needed within the scope of the disclosure.

What is claimed is:

1. A crash box configured to absorb an impact caused by a collision of a vehicle, the crash box comprising:
    a front end surface configured to receive the impact;
    a rear end surface configured to be attached to the vehicle; and
    a first wall surface and a second wall surface both extending from the rear end surface to the front end surface, the first wall surface and the second wall surface facing each other,
    wherein a length of the second wall surface from the front end surface to the rear end surface is longer than a length of the first wall surface from the front end surface to the rear end surface, and
    wherein an absolute value of a difference between the length of the first wall surface and the length of the second wall surface is equal to approximately 50% of a buckling wavelength of the first wall surface or approximately 50% of a buckling wavelength of the second wall surface.

2. The crash box according to claim 1, wherein at least one of the first wall surface or the second wall surface is provided with a cutout.

* * * * *